Sept. 18, 1923.

E. O. WEISENBERGER 1,468,186

QUICK CHANGE CHUCK

Filed July 5, 1922

INVENTOR.
Earl. O. Weisenberger
BY
Toulmin & Toulmin
ATTORNEYS.

Patented Sept. 18, 1923.

1,468,186

UNITED STATES PATENT OFFICE.

EARL O. WEISENBERGER, OF ARCANUM, OHIO, ASSIGNOR TO THE QUICK CHANGE CHUCK MFG. CO., OF ARCANUM, OHIO, A CORPORATION OF OHIO.

QUICK-CHANGE CHUCK.

Application filed July 5, 1922. Serial No. 573,009.

*To all whom it may concern:*

Be it known that I, EARL O. WEISENBERGER, a citizen of the United States, residing at Arcanum, in the county of Darke and State of Ohio, have invented certain new and useful Improvements in Quick-Change Chucks, of which the following is a specification, reference being had therein to the accompanying drawing.

My invention relates to machine tools and in particular to a quick change chuck for machine tools.

It is the object of my invention to provide a chuck the jaws of which may be quickly changed with the minimum of hand work and tool work in order to effect the adjustment.

It is an additional object of my invention to provide means for simply and positively locking into position the several chuck jaws without the use or aid of tools.

It is a further object of my invention to provide means for quickly and effectively locking and unlocking the chuck and upon unlocking it to disassemble the entire structure into its component parts without any further aid of tools.

It is still an additional object to provide a construction which will be as strong as a construction without the quick change feature, and will be light enough to facilitate rapid handling of the chuck on a machine tool.

Referring to the drawings.

Figure 1:
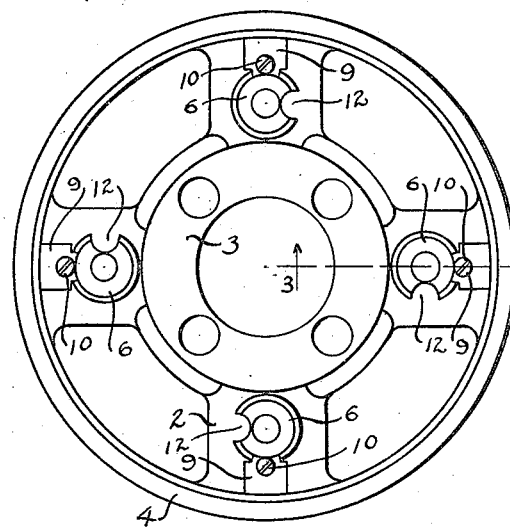
Fig. 1 is an elevation from the adjusting end of the spider showing the adjusting means in their locked positions.
Figure 2:
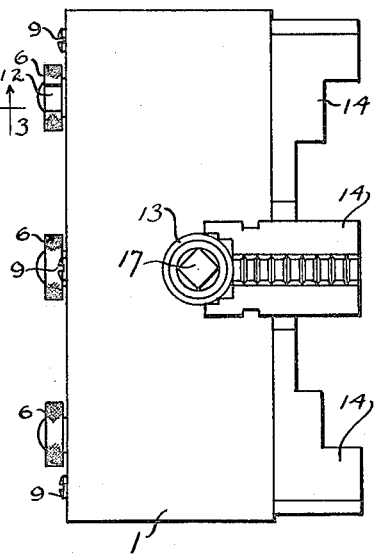
Fig. 2 is a side elevation of the spider with the chuck jaws in position.
Figure 3:
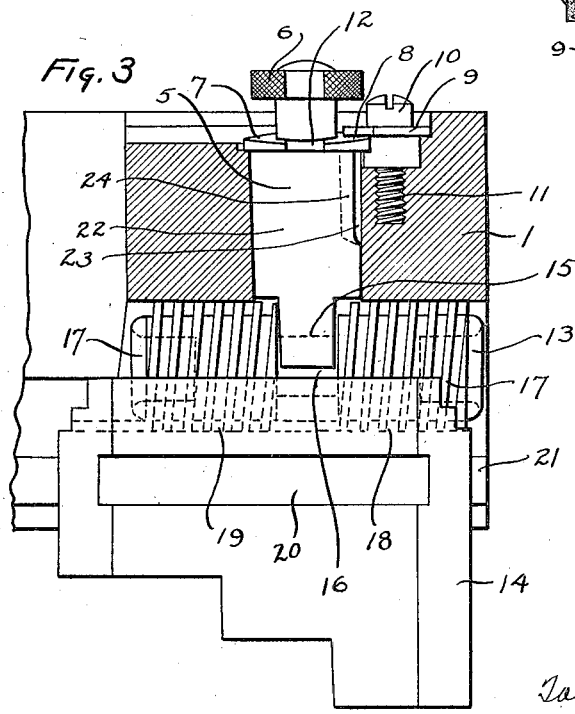
Fig. 3 is a section on the line 3—3 of Fig. 1 showing the arrangement of the locking parts, the worm and the chuck jaw in relation to the spider.

Referring to the drawings in detail, 1 is a spider having a plurality of arms 2 joined to a central ring 3 on their inner ends and to an outside ring 4 on their outer ends.

Located in each of these arms is the locking mechanism for locking the respective chuck jaw and worm in position. This locking mechanism consists of a locking member 5 having a knurled head 6 revolubly mounted thereon and projecting beyond the periphery of the spider. This head 6 carries a cam collar 7 of varying thickness with a cam surface 8. Adjacent to and in contact with this cam surface is a locking washer 9 retained in position by the set screw 10 which is threaded into the portion designated 1 as at 11. This facilitates the adjustment of the locking engagement of 9 with 7. 7 is cut away at 12 so that when the head 6 is rotated to bring the space 12 opposite 9 the member 5 may be completely removed for the disengagement of it with the worm 13 which allows the worm together with the chuck jaw 14 to be moved out of the spider bodily for adjustment and change.

The lower end of 5 consists of a pair of jaws 15 in engagement with the cylindrical central portion 16 of the worm 13. The worm proper is formed in two portions separated by the portion 16 so that the jaws 15 project between these portions of the worm to prevent the worm from moving longitudinally in either direction. The worm is provided at either end with a socket 17 for a plug wrench which is inserted at this place to rotate the worm when the parts are in locked engagement so that the threads of the worm as at 18 may engage with corresponding threads 19 on the jaw 14 to move it inwardly or outwardly. This jaw has tongues 20 thereon working in grooves 21 in the spider to guide its inward and outward movement.

It is thus apparent when it is desired to unlock the chuck jaw quickly all that it is necessary to do is to turn the end 6 swinging the cutaway portion 12 opposite 9, whereupon 5 can be removed and then 13 and 14 may be quickly taken out of the spider and adjusted to suit the desires of the operator.

In order to restore the parts they are relocated in position as shown and the knurled head 6 is turned to a point where 7 is brought beneath the locking washer 9 due to the engagement of the cam surface on 7 as at 8 with 9 which locks the several parts in engagement with one another. The adjustment of 14 radially is made possible by the insertion of the wrench in the socket 17 and the rotation as a consequence of the worm 13 which in turn actuates the chuck jaw 14 on the spider.

The cutaway portion 22 in which 5 is inserted is provided with a key 23 which fits into a corresponding keyway 24 in 5 in order to properly guide and quickly position 5 and its jaws 15 with relation to the central portion 16 of the worm 13.

It will be understood that I comprehend within my invention the suitable and necessary modifications of it which may become necessary in the course of adapting it to varying conditions.

Having thus fully described my invention, what I claim as new and desire to secure by Letters Patent, is:—

1. In a chuck of the class described, a spider, a series of radially disposed worms mounted in said spider, a series of jaws each operable by a respective worm, each of said worms having a reduced portion intermediate its ends, and means to lock said worms against longitudinal movement comprising a fork member straddling the reduced portion of the respective worm, cam means rotatably mounted on said fork member, and an abutment against which said cam means bears, said cam means having one portion slotted to pass said abutment when brought into registry therewith.

2. In a chuck of the class described, a spider, a series of radially disposed worms mounted in said spider, a series of jaws operable by a respective worm, each of said worms having a reduced portion intermediate its ends, means to lock said worms against longitudinal movement comprising fork members each slidably mounted in the spider to move toward and from a respective worm, a revoluble head mounted on each of the fork members and carrying a cam collar having a peripheral notch, said cam collar having one side formed to constitute a face cam, and an abutment carried by the spider for each of said cam collars, each cam collar bearing beneath a respective abutment, said abutment and the peripheral notch of the cam collar being dimensioned to permit freeing of the collar from the abutment when said collar is brought into registry with the abutment.

3. In a chuck of the class described including jaws and worms for moving said jaws having reduced portions intermediate their ends, means for preventing longitudinal movement of each worm, and comprising an element movable at right angles with respect to the axis of the worm, cam means supported by the chuck and element for moving said element toward and from the worm, said cam means including a face cam axially alined with said element and rotatably mounted thereon, means to rotate said face cam, and a stationary abutment on the chuck against which said face cam bears.

In testimony whereof, I affix my signature.

EARL O. WEISENBERGER.